United States Patent [19]

deMey, II et al.

[11] 4,234,790

[45] Nov. 18, 1980

[54] PHOTODETECTOR HEAT STABILIZER

[75] Inventors: Charles F. deMey, II, West Redding; Charles C. Helms, Trumbull, both of Conn.

[73] Assignee: The Perkin-Elmer Corporation, Norwalk, Conn.

[21] Appl. No.: 8,373

[22] Filed: Feb. 1, 1979

[51] Int. Cl.³ .............................................. H01J 7/24
[52] U.S. Cl. .................................................. 250/238
[58] Field of Search ....................................... 250/238

[56] References Cited

U.S. PATENT DOCUMENTS 4,090,071  5/1978  McCarter ............................ 250/238

Primary Examiner—David C. Nelms
Assistant Examiner—Darwin R. Hostetter
Attorney, Agent, or Firm—S. A. Giarratana; F. L. Masselle; E. T. Grimes

[57] ABSTRACT

Temperature sensitive photodetectors are temperature stabilized by coupling the photocathode of a photodetector in heat exchange relationship to a heated casting which acts as a heat source for the photocathode. The photocathode is coupled to the casting by a metallic Z-shaped bracket positioned on an insulating block with one base of the Z being coupled to the photocathode and the other base being coupled to a metal box through a Mylar insulating spacer, the box being directly mounted on the casting. A printed circuit board associated with the photodetector is also mounted on the insulating block. The direct heat path from the heated casting through the Z-shaped bracket to the photocathode reduces the warm up time of the photodetector thereby more rapidly temperature stabilizing the photodetector.

7 Claims, 7 Drawing Figures

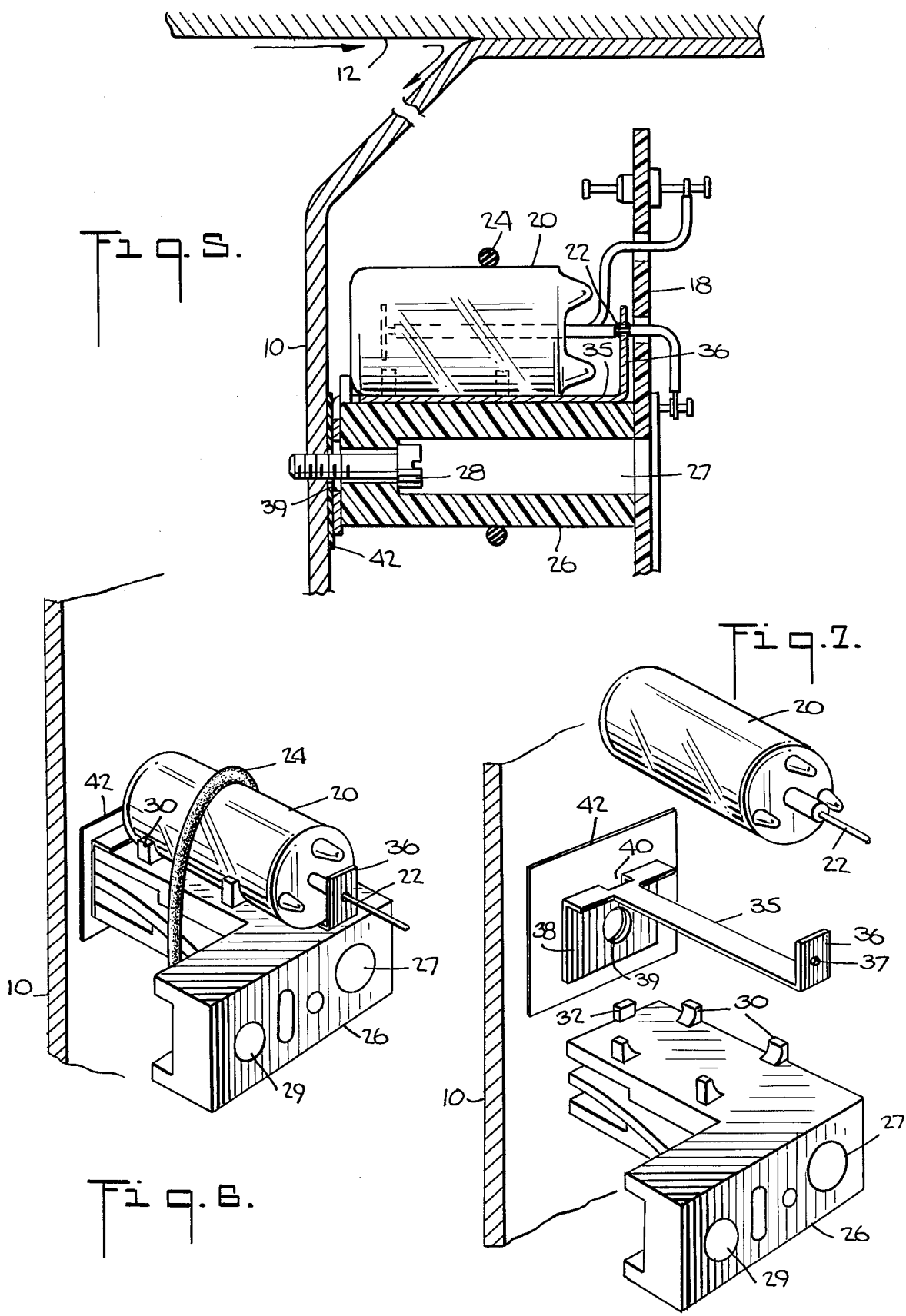

PHOTODETECTOR HEAT STABILIZER

BACKGROUND OF THE INVENTION

This invention relates to photodetector heat sink mounting structure, and more particularly to heat sink mounting structure for conducting heat from an external source to the photocathode of a photodetector to reduce the warm up time of the photodetector in order to temperature stabilize the photodetector and to maintain the temperature stabilization.

One of the problems encountered in employing photodetector tubes resides in the fact that the photodetector tubes are temperature sensitive. Therefore, their output for a given amount of illumination changes with temperature. The photodetector is most susceptible to such temperature variation from the time the phototube is turned on until it heats up to an operating temperature and becomes temperature stabilized. For some vacuum photodiodes employing rare earth photocathodes, the warm up time may require 4 to 5 hours. Of course, measurements made during this period would be subject to considerable drift due to different operating temperatures. The delay in making analytical measurements thus becomes timeconsuming and costly.

Separate heat sources could be supplied, specifically for the purpose of heating up the photodetector but this is a costly procedure requiring extra elements and heating sources. A better solution in accordance with the present invention is to utilize an already existing heat source which requires no additional heating elements and to use the heat from such a source for the purpose of heating up the photodetector. Accordingly, it is an object of this invention to provide a method of heating a photodetector which requires no additional heating sources but utilizes heat sources which are available in the proximity of the photodetector in a simple and efficient manner.

Another object of this invention is to provide a relatively inexpensive and simple structure for heating a photodetector to more quickly stabilize its operating temperature.

SUMMARY OF THE INVENTION

In carrying out this invention in one illustrative embodiment thereof, heat is applied from an external heat source to the photocathode of a photodetector by placing the photocathode in heat conducting relationship with the external source. In an illustrative example, this is accomplished by a Z-shaped metallic bracket which is coupled on one end thereof to the photocathode of a photodetector and mounted on the other end thereof through an electrical insulating layer to a housing which is in heat conductive relationship with the external source. In this manner, the external source is coupled through the housing and the metal bracket to the photodetector to more rapidly heat up and stabilize its temperature with respect to its environment.

BRIEF DESCRIPTION OF THE DRAWINGS

The invention, both as to organization and method of operation, will be more clearly understood from the following description taken in connection with the accompanying drawings, in which:

FIG. 5 is an enlarged cross-sectional view of the upper portion of FIG. 3 showing the mounting structure for the photodetector in accordance with the present invention;

FIG. 6 is a perspective view of the mounting structure for the photodetector illustrated in FIG. 5 with the printed circuit board removed; and FIG. 7 is an exploded perspective view of FIG. 6.

DESCRIPTION OF THE PREFERRED EMBODIMENT

The technique involved in the present invention is unlike the typical heat sink function for an electronic component in which the component generates heat which must be dissipated for the component to function properly and not get overheated. In accordance with the present invention, the electronic component which is a photodetector does not heat up as quickly as desired, and accordingly, the photodetector does not function properly until the photodetector becomes temperature stabilized. The delay as well as the unstable operation of the device are undesirable particularly when analytical and other critical measurements are to be made. For many applications where the photodetector is utilized, for example, in liquid chromatography and others the equipment in which the photodetector is utilized contains external heat sources of high intensity such as a deuterium lamp as well as others which rapidly heat up the casting on which the photodetector is mounted. The present invention utilizes such external heat sources to heat up the photocathode in a manner which more rapidly stabilizes the temperature of the photodetector.

Figure 1:
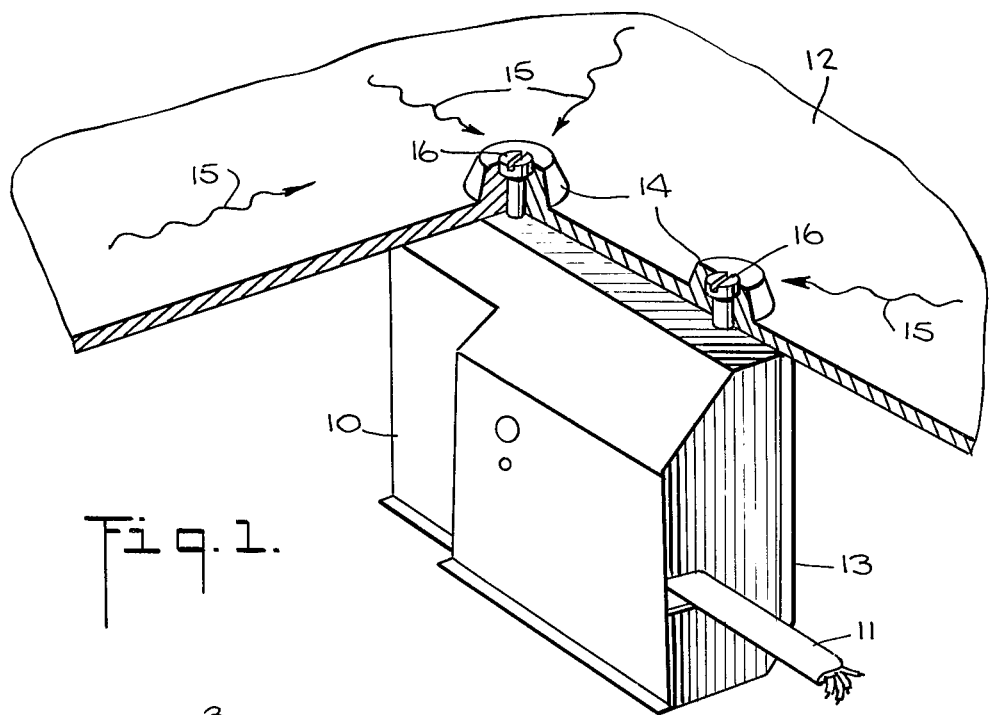
FIG. 1 is a perspective view of a housing containing a photodetector and associated circuitry mounted to a casting which serves as an external heat source.

Referring now to FIG. 1, an electrometer box or housing 10 containing a photodetector and having a cable 11 extending therefrom containing the electrical connections to the internal circuitry is mounted to metallic casting 12 by screws 16 positioned in bosses 14 of the casting 12. The casting 12 is heated by other elements and heat sources mounted on the casting 12 and the heat therein indicated by the wavey arrows 15 is transmitted through the bosses 14 to the housing 10 which is in intimate heat exchange relationship with the casting 12. The housing 10 has a removable rear cover 13.

Figure 2:
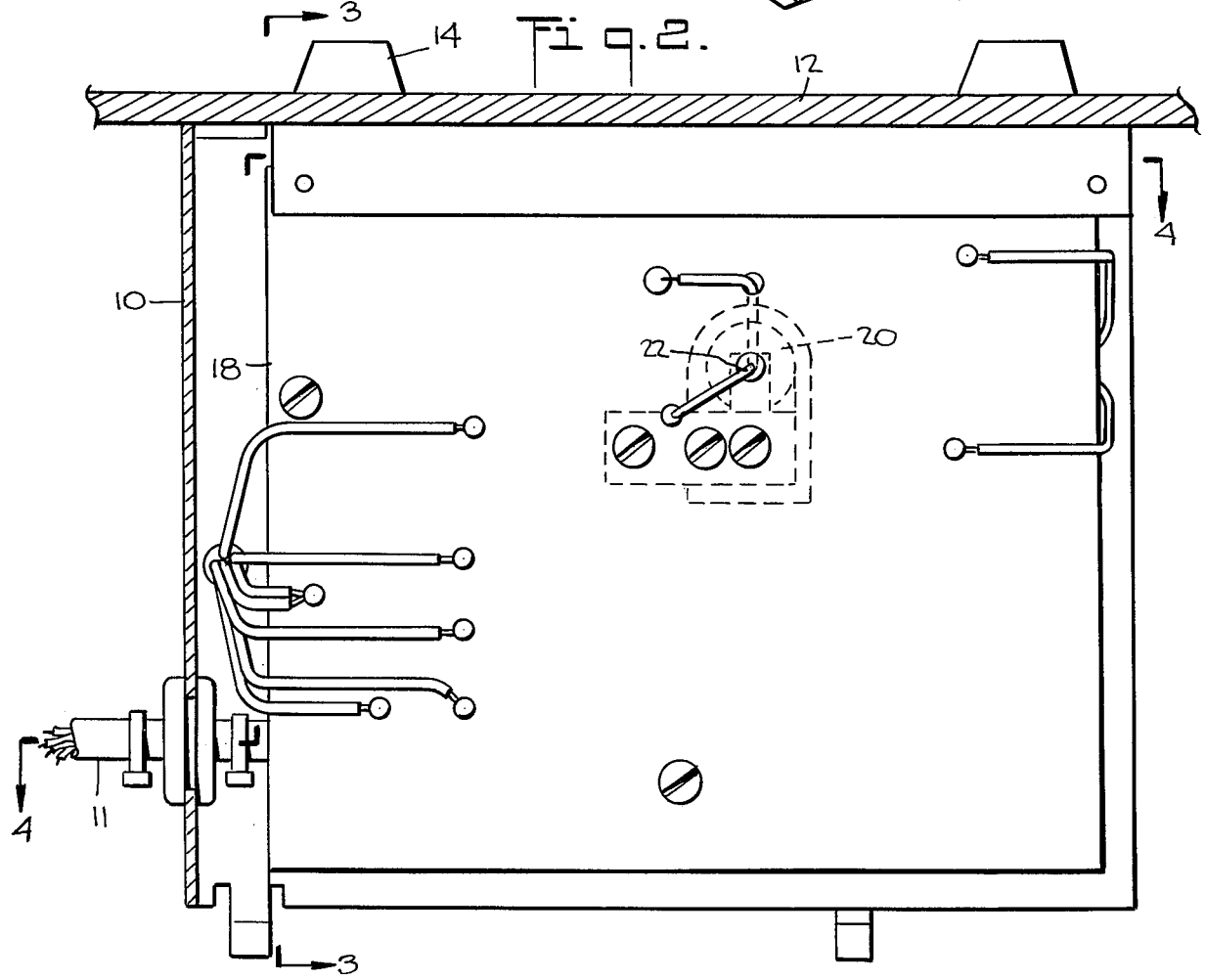
FIG. 2 is a rear view of FIG. 1 with the housing cover removed to show the printed circuit board on which the photodetector is mounted.

In FIG. 2 the rear cover 13 has been removed showing a printed circuit board 18 mounted within the housing 10. The circuit board 18 has a photodetector 20 with a photocathode lead 22 extending therefrom positioned between the circuit board and the housing 10.

Figure 3:
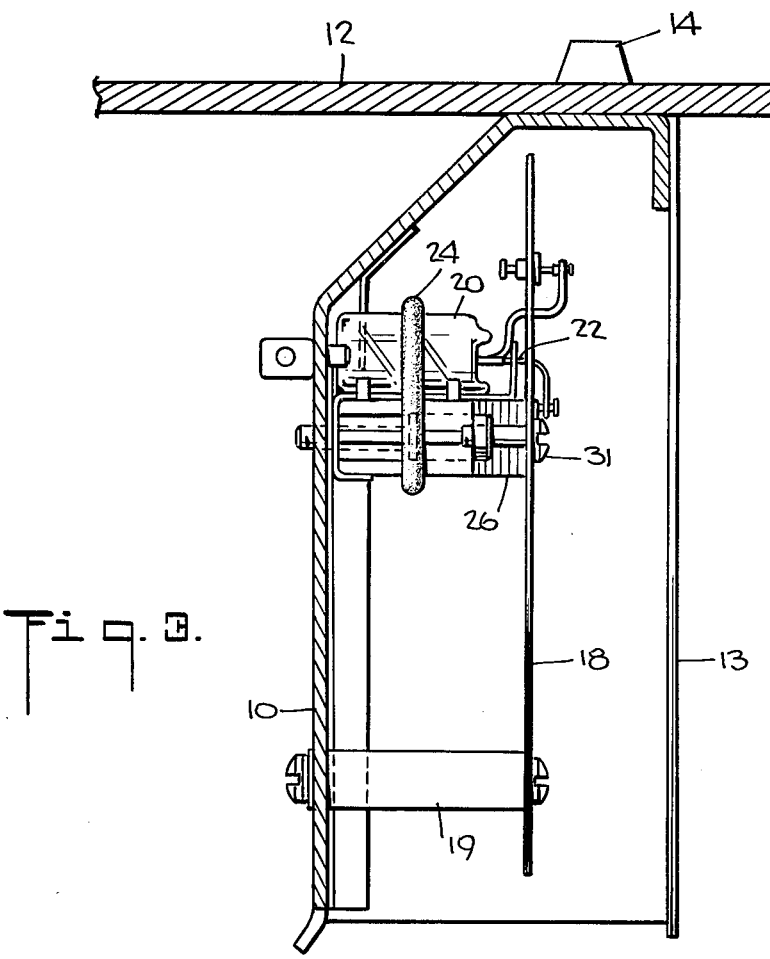
FIG. 3 is a cross-sectional view taken along the line 3—3 of FIG. 2.
Figure 4:
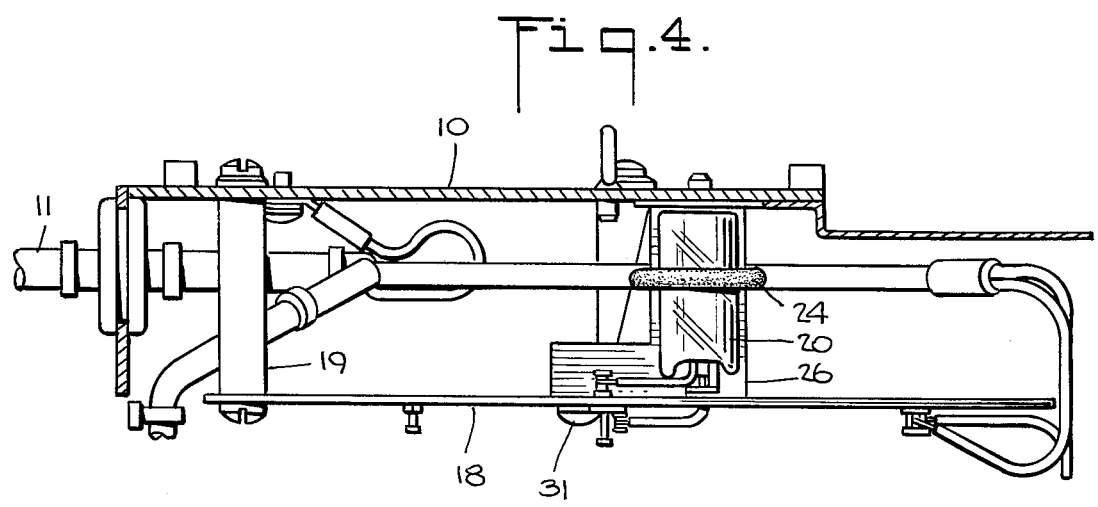
FIG. 4 is a cross-sectional view taken along the line 4—4 of FIG. 2.

FIGS. 3 and 4 illustrate the mounting of the circuit board 18 on the housing 10 by an insulated spacer 19 and an insulating block 26. The photodetector is mounted on the insulating block 26 by a rubber O-ring 24. The photoconductor lead 22 and other leads from the photodetector 20 are coupled to terminals on the printed board 18.

As will be best seen in FIGS. 5, 6 and 7, which illustrate in greater detail the heat sink mounting structure for the photodetector 20, the insulating block 26 has a channel 27 therein through which the screw 28 mounts the insulating block 26 to the housing 10. Another channel 29 in the insulating block 26 houses a screw 31 (see FIGS. 3 and 4) which secures the printed circuit board 18 to the insulating block 26. As will be best seen in FIG. 7, the insulating block 26 carries on its upper surfaces thereof a plurality of shaped studs 30 which form a cradle in which the photodetector 20 rests. A rectangular stud 32 at the rear of the insulating block 26 positions the photodetector 20 in the cradle formed by the studs 30.

The heat sink arrangement for the photodetector 20 which is best shown in FIG. 7 comprises a metallic bracket 35 which is a good heat conductor, for example, copper. The bracket 35 is generally Z-shaped having an upstanding projection 36 on one end thereof with a hole 37 therethrough which is adapted to house the photocathode lead 22 therein and is secured thereto by any suitable means, such as solder, so that the bracket is in good heat exchange relationship with the photocathode 22. The other end of the bracket 35 is a downward extending base member 38 having an opening 39 therethrough and a rectangular shaped opening 40 extending from the bend of the bracket 35. An insulating layer 42 is positioned between the base member 38 of the bracket 35 and the housing 10 for electrically insulating the bracket from the housing. The insulating layer 42 is thin and may be made of a suitable material such as Mylar which does not significantly disturb the heat conducting path between the housing 10 and the bracket 35. The block 26 is mounted by the screw 28 through the channel 27 in the insulating block 26 and through the opening 39 in the bracket 35 with the rectangular stud 32 being positioned in a rectangular channel 40 in the bracket 35. The intermediate portion of the bracket 35 therefore rests on the block 26 between the studs 30. Completing the assembly, a rubber O-ring 24 encircles the photodetector 20 and the insulating block 26 to hold the photodetector 20 in the cradle formed by the studs 30 against the bracket 35 on the insulating block 26.

In accordance with the aforesaid structure, heat from the casting 12 is conducted to the housing 10 through the thin insulating layer 42 to the bracket 35 and is ultimately applied to the lead 22 of the photocathode of the photodetector 20. The heat from the casting 12 conducted by the heat sink arrangement heats up the photodetector 20 so that the photodetector 20 is rapidly temperature stabilized and ready to function. At the same time, the printed circuit board and its associated photodetector 20 are electrically insulated by the insulating block 26 and the insulating layer 42 from the housing 10.

Once the photodetector has warmed up to operating temperature and is temperature stabilized, the massive heat sink serves to damp out fluctuations in temperature caused by changes in room temperature or other temperature changes. Accordingly, once the heat sink becomes temperature stabilized so does the photodetector which remains so stabilized.

Although heat stabilization is illustrated with respect to one phototube, it should be appreciated that the same or similar heat sink arrangements may be used to temperature stabilize more than one phototube. For example, in a dual path, double beam analytical instrument, two detectors would be required. Coupling both detectors to the same heat sink would be desirable in order that both photodetectors operate at the same temperature.

Since other changes and modifications varied to fit particular operating requirements and environments will be apparent to those skilled in the art, the invention is not considered limited to the examples chosen for purposes of illustration, and covers all changes in modifications which do not constitute departures from the true spirit and scope of this invention.

What is claimed is:

1. A photodetector mounting structure for rapidly heating the photodetector to operating temperature comprising:
   (a) a photodetector having a photocathode,
   (b) a heat conductive casting,
   (c) a block of insulating material on which said photodetector is mounted,
   (d) a metallic strip positioned on said block of insulating material,
   (e) said metallic strip having one end thereof coupled to said photocathode and the other end thereof coupled in heat conducting relationship with said casting, and
   (f) electrical insulating means mounted between said casting and said metallic strip.

2. The photodetector mounting structure set forth in claim 1 wherein said metallic strip is Z-shaped.

3. The photodetector mounting structure set forth in claims 1 or 2 in which said electrical insulating means comprises a thin Mylar strip.

4. The photodetector mounting structure set forth in claims 1 or 2 wherein said block of insulating material has a plurality of shaped studs forming a cradle-like support for said photodetector.

5. A photodetector heat sink for rapidly stabilizing the temperature of the photodetector by conducting heat thereto from the external structure to which it is mounted comprising:
   (a) a photodetector having a photocathode,
   (b) a housing which acts as a heat source for said photodetector,
   (c) a thin electrical insulating layer positioned on said housing,
   (d) a metallic heat sink for said photodetector mounted in heat conducting relationship on said insulating layer at one end thereof to said housing and at the other end thereof to said photodetector, and
   (e) an insulating member having means for positioning said heat sink and said photodetector thereon such that the heat sink is in heat conducting relationship with said photodetector along the length thereof whereby the temperature of said photodetector is rapidly stabilized from the heat transmitted thereto by said housing through said heat sink.

6. The photodetector heat sink set forth in claim 5 in which the means for positioning said heat sink includes a plurality of spaced, shaped studs on said insulating member forming a cradle on said insulating member for said photodector.

7. The photodetector heat sink set forth in claim 5 in which said heat sink contains an opening therein and said insulating member has a stud which fits into said opening when said heat sink is positioned on said insulating member.